March 10, 1931.  F. G. CORNELL, JR  1,795,837
HEAT EXCHANGE DEVICE
Original Filed April 9, 1929
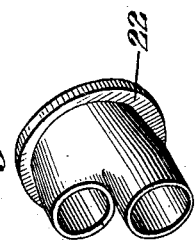
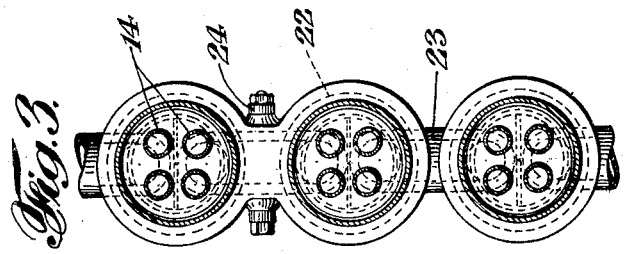
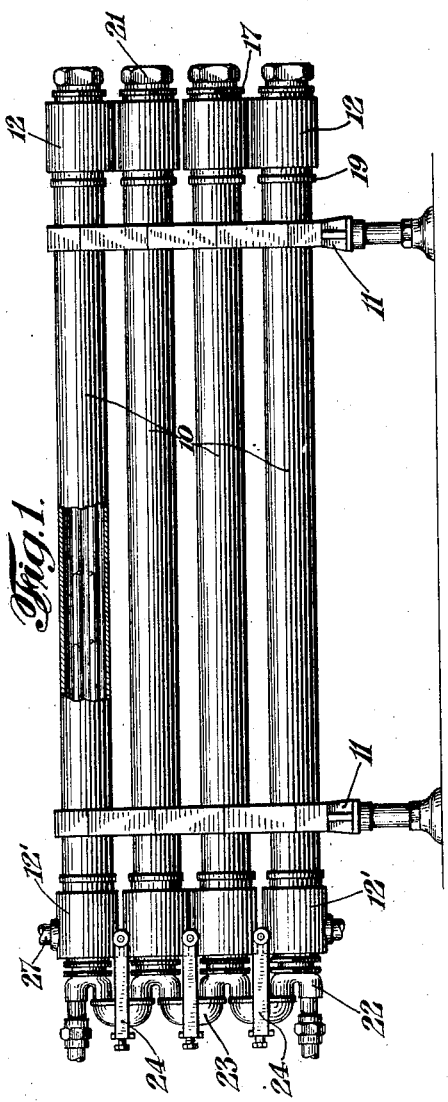
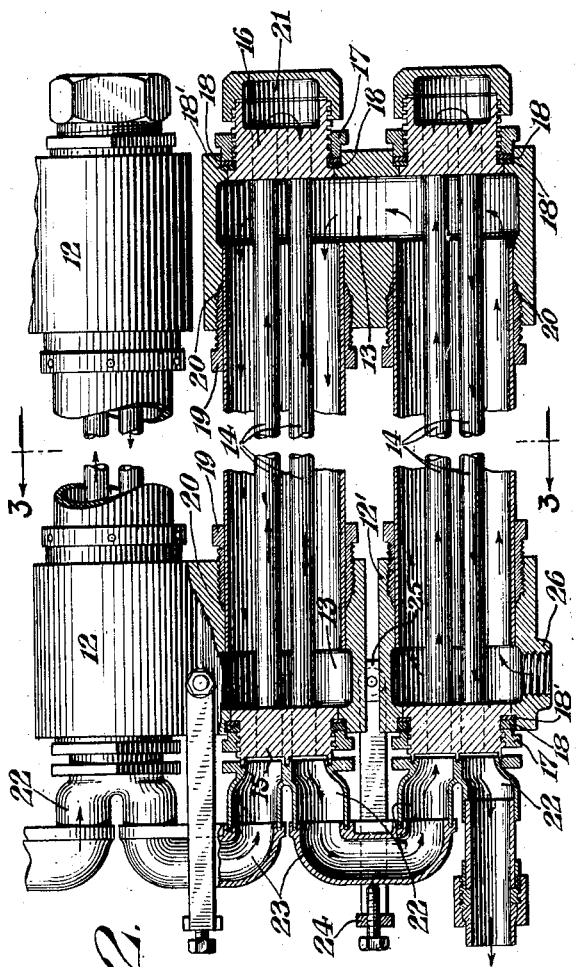
INVENTOR
Fritz G. Cornell, Jr
BY
Kenyon & Kenyon
ATTORNEYS Patented Mar. 10, 1931

1,795,837

UNITED STATES PATENT OFFICE

FRITZ G. CORNELL, JR., OF MOUNTAIN LAKES, NEW JERSEY, ASSIGNOR TO JENSEN CREAMERY MACHINERY CO., OF BLOOMFIELD, NEW JERSEY, A CORPORATION OF NEW YORK

HEAT-EXCHANGE DEVICE

Original application filed April 9, 1929, Serial No. 353,838. Divided and this application filed February 20, 1930. Serial No. 429,872.

This invention relates to heat exchange devices and has for an object a simple, inexpensive, compact, efficient and sanitary apparatus suitable for use, either in heating or cooling milk, cream and other liquid products.

An apparatus embodying the invention comprises a plurality of substantially parallel pipes serially connected by means of headers slidably mounted on the pipes and having a fluid tight connection therewith and a cluster of tubes in each pipe. Tubes of one pipe are connected with the tubes of another pipe by conduits which are held in position by clamps supported by the headers. This arrangement permits relative expansion and contraction of the tubes and enclosing pipes without subjecting the apparatus to damaging strains or stresses. Milk or other liquid products are caused to flow through the tubes and cooling or heating liquid is caused to flow through the pipes around the tubes in the opposite direction or in the same direction as the milk. By the use of a plurality of small tubes for the milk, the efficiency of heat exchange between the heating or cooling fluid and the milk is very high due to the large area subject to the turbulent flow of milk. Moreover, in the apparatus above described, due to the heat exchange efficiency of the small tubes and the turbulent action therein, there is no dead core of milk passing through the tubes with the result that the milk is uniformly and efficiently cooled or heated.

In one type of apparatus, the tubes are divided into two or more groups which communicate with each other through a chamber provided at one end of the pipe in which they are arranged. The groups of tubes in each pipe communicate with similar groups in the adjacent pipes, one group of tubes of each pipe being connected to a group of tubes in the pipe ahead of it and the other group of tubes of said pipe being connected with the group of tubes behind it. Milk or other products flowing through the tubes is thus caused to travel out and back through the tubes in one pipe before it is transferred to a group of tubes in the next pipe. The heating or cooling fluid is caused to flow through the enclosing pipes around the tubes, the milk or other liquid products being introduced into the tubes at one end of the apparatus and the cooling or heating fluid being introduced into the pipes either at the same or the other end of the apparatus.

This application is a division of the copending application of Fritz G. Cornell, Jr. Serial No. 353,838, filed April 9, 1929.

Other objects, novel features and advantages of this invention will be apparent from the following specification and accompanying drawings, wherein:

Fig. 1 is a side elevation of an apparatus embodying the invention.

Fig. 2 is an enlarged view partly broken away of a section of such apparatus.

Fig. 3 is a section on the line 3—3 of Fig. 2, and

Fig. 4 is a perspective view of a fitting used in the apparatus.

A plurality of parallel pipes 10 are supported by standards 11. These pipes are serially connected by headers 12, each header having bores for receiving the corresponding ends of a pair of pipes 10 and having a passageway 13 leading from one bore to the other. The free ends of the top and bottom pipes are provided with inlet and outlet sleeves 12'. A cluster of tubes 14 extends through each pipe 10, the ends of the tubes being inserted and fixed in apertures in plugs 15 and 16 which close the bores in the sleeves 12' and headers 12. Around each plug, there is provided a gland 17 which bears against a gasket 18 and a ring 18' thereby forming a tight joint between the plug and header or sleeves in which it is arranged. Glands 19 surround the pipes 10 and are threaded into the bores of the headers 12 and sleeves 12'. These glands compress a packing 20 thereby producing a tight joint between the headers and sleeves and the pipes.

Each of the plugs 16 is slightly recessed and is provided with a recessed cover 21 attached thereto. The recess in the cover forms a chamber by which one set of tubes 14 communicate with the other set of tubes within the same pipe. At their other ends, the tubes 14 communicate with passageways in a fitting 22 which engages the plug 15. Each fitting has two passageways and half of the tubes 14 communicate with one passageway and the other half with the remaining passageway. Conduits 23 provide communication between one passageway of one fitting 22 and a passageway of another fitting 22. The conduits 23 are held with their ends engaging the ends of the passageways in the fittings 22 by a yoke 24 pivoted to a bar or strap 25 which is carried by the adjacent headers. One passageway of the bottom fitting 22 acts as an outlet from the tubes, while one passageway of the top fitting acts as an inlet to the tubes or vice versa. The headers and plugs constitute caps for the ends of the pipe.

Milk or other liquid product to be cooled or heated is introduced into the tubes through the inlet and is first caused to pass out and back through the tubes in the top pipe. The milk passes out through one half of the tubes and into the chamber formed by the cap 21 from whence it flows back through the remaining group of tubes and is then transferred by means of the conduit 23 to a group of tubes in the next lower pipe and so on until the milk is eventually discharged from the outlet. The heating or cooling fluid is introduced into the bottom sleeve 12' through an inlet 26 and is caused to flow through the bottom pipe, then into the next upper pipe by passageway 13 and so on until it reaches the outlet 27 in the top sleeve 12' from which it is discharged from the apparatus or the direction of circulation may be reversed. The use of a large number of small tubes for the milk provides a large heat exchange surface and causes the milk to flow at a sufficiently high velocity to prevent scorching of the milk or other harmful action on it. Also dead cores of milk are prevented due to the efficiency of the turbulent action and the milk is thoroughly mixed at each end of a group of tubes before entering another group which insures uniform treatment.

Expansion or contraction of the tubes 14 does not produce any harmful strains on the apparatus. This is due to the fact that the headers are slidably mounted on the pipes 10. As the tubes 14 expand, the plugs 15 and 16 tend to move to the left and right and exert a pull on the yokes 24. This pull, instead of putting a strain on the apparatus merely is effective to slide the headers 12 and sleeves 12' on the pipe 10. When the tubes contract, the plugs exert pressure through the rings 18' and the headers and tend to return the same to normal position and maintain the yokes 24 in clamping relationship to the conduits 23. Because of the full floating relationship of the headers to the pipes, there is no opportunity of injury to the apparatus because of contraction and expansion strains. The apparatus takes up but little floor space and may be easily and quickly sterilized by the passage of steam through the same.

Although the invention has been disclosed as a multiple pipe apparatus, it is apparent that it may be embodied in a single pipe apparatus. It is, of course, understood that various other changes may be made in the structure above described, without in any way departing from the spirit of the invention as defined in the appended claims.

I claim:

1. A device of the character described comprising a plurality of substantially parallel pipes, a plurality of groups of tubes in each pipe, headers connecting in pairs the corresponding ends of adjacent pipes, each header having bores in which said ends are slidably sealed, plugs sealing said bores and having apertures within which are fixed the ends of said tubes, fittings engaging said plugs, each fitting having passageways communicating with the groups of tubes in the corresponding pipe, conduits connecting each passageway of one fitting with a passageway of another fitting, passageways in said headers connecting the bores, and means supported by said headers for clamping said conduits and fittings in position.

2. A device of the character described comprising a plurality of pipes, a plurality of groups of tubes in each pipe, headers connecting in pairs corresponding ends of adjacent pipes, each header having bores in which said ends are sealed, plugs slidably sealing said bores and having apertures within which are fixed the ends of said tubes, means at one end of each pipe for providing communication between the groups of tubes therein, conduits having their ends engaging plugs in the opposite ends of said pipes and providing communication between groups of tubes of adjacent pipes, passageways in said headers connecting the bores, and means supported by said headers for clamping said conduits in position.

3. A device of the character described comprising a plurality of serially connected substantially parallel pipes, a plurality of groups of tubes in each pipe, means at one end of each pipe for providing communication between the groups of tubes therein, and means at the opposite end of each pipe for providing communication between a group of tubes in one pipe and a group of tubes in another pipe.

4. A device of the character described comprising a plurality of substantially parallel pipes, a plurality of groups of tubes in each pipe, headers connecting in pairs the corresponding ends of adjacent pipes, each header having bores in which said ends are slidably sealed, plugs sealing said bores and having apertures within which are fixed the ends of said tubes, fittings engaging said plugs, each fitting having passageways communicating with the groups of tubes in the corresponding pipe, passageways in said headers connecting the bores, and conduits connecting each passageway of one fitting with a passageway of another fitting.

5. A device of the character described comprising a plurality of pipes, groups of tubes in each pipe, caps slidably sealing the ends of said pipes and having apertures within which are fixed the ends of said tubes, the caps at one end of said pipes having chambers for providing communication between the groups of tubes in each pipe, and conduits having their ends engaging the caps at the other end of said pipes to provide communication between a group of tubes in one pipe and a group of tubes in an adjacent pipe.

6. A device of the character described comprising a plurality of pipes, groups of tubes in each pipe, caps slidably sealing the ends of said pipes and having apertures within which are fixed the ends of said tubes, the caps at one end of said pipes having chambers for providing communication between the groups of tubes in each pipe, conduits having their ends engaging the caps at the other end of said pipes to provide communication between a group of tubes in one pipe and a group of tubes in an adjacent pipe, and means supported by said caps for clamping said conduits in position.

In testimony whereof, I have signed my name to this specification.

FRITZ G. CORNELL, Jr.